United States Patent [19]

Leiber

[11] 4,143,514
[45] Mar. 13, 1979

[54] MASTER BRAKE CYLINDER FOR TWO-CIRCUIT BRAKING SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 703,799

[22] Filed: Jul. 9, 1976

[30] Foreign Application Priority Data

Jul. 12, 1975 [DE] Fed. Rep. of Germany ....... 2531264

[51] Int. Cl.² .......................................... B60T 17/22
[52] U.S. Cl. ........................................ 60/534; 60/545; 60/554; 60/565; 60/581; 60/582; 60/591; 60/592; 303/114
[58] Field of Search ................. 60/548, 534, 545, 593, 60/581, 546, 554, 535, 547, 582, 565, 591, 592; 92/5 R; 200/82 R; 303/114; 340/52 C

[56] References Cited

U.S. PATENT DOCUMENTS

| | | | |
|---|---|---|---|
| 2,764,176 | 9/1956 | Darquier | 340/52 C |
| 3,618,321 | 11/1971 | Moran | 60/548 |
| 3,686,864 | 8/1972 | Shutt | 60/535 |
| 3,889,467 | 6/1975 | Huffman | 60/548 |
| 3,926,093 | 12/1975 | Nakagawa | 60/547 |
| 3,946,564 | 3/1976 | Nakagawa | 60/548 |
| 3,979,153 | 9/1976 | Ingram | 303/114 |
| 4,015,881 | 4/1977 | Adachi | 60/548 |

FOREIGN PATENT DOCUMENTS

| | | | |
|---|---|---|---|
| 2343882 | 4/1975 | Fed. Rep. of Germany | 60/582 |
| 1345951 | 2/1974 | United Kingdom | 60/547 |

Primary Examiner—Martin P. Schwadron
Assistant Examiner—Abraham Hershkovitz
Attorney, Agent, or Firm—Edwin E. Greigg

[57] ABSTRACT

A master cylinder for a two-circuit brake system which includes anti-skid control has two separate chambers and pistons. The main control piston is surrounded by an auxiliary piston which it engages after a predetermined amount of travel. The auxiliary piston has an extension which holds the brake control valve and which is opened by the control piston during its travel. Furthermore, the second circuit cylinder includes a pressure sensor which can activate a warning when the piston travel is not in a predetermined relation to the applied fluid pressure.

1 Claim, 4 Drawing Figures

MASTER BRAKE CYLINDER FOR TWO-CIRCUIT BRAKING SYSTEM

BACKGROUND OF THE INVENTION

The invention relates to a two circuit braking system for vehicles, and more particularly to a master brake cylinder for such a system. The master cylinder includes an auxiliary piston within which slides a control piston. When suitably displaced, the control piston opens a control valve disposed between a source of brake pressure and a first braking circuit. The pressure within the first braking circuit reacts back onto the control piston and also onto the control surface of a piston functioning in the main cylinder intended for the second braking circuit. A master brake cylinder of this type is described in the German Offenlegungsschrift No. 2 312 641. In the apparatus of that publication, after the control piston has been slightly displaced, a flat seat valve lying between a source of pressure and the first brake circuit is opened but this opening also requires the opening of a slide valve. The pressure fed to the second brake circuit also affects the control surface of the piston for the second brake circuit and displaces it.

The known apparatus also includes an auxiliary piston which is displaced by the pedal when the source of pressure fails and which thus creates the brake pressure for both circuits. The apparatus further includes mechanical means passing through the auxiliary piston and providing a displacement of the piston for the second brake circuit when the pedal is actuated but when the first circuit leaks.

OBJECT AND SUMMARY OF THE INVENTION

It is a principal object of the present invention to improve the known master brake cylinder so as to make it simple in construction while maintaining its advantages.

This object is attained according to the invention by providing that the surface of the auxiliary piston remote from the pedal is exposed to the pressure from the brake pressure source and also includes the braking control valve. it is further provided that the auxiliary piston has an extension protruding into the control chamber of the main cylinder and this extension engages the piston of the main brake cylinder when sufficiently near.

The apparatus according to the invention provides the advantage of easier ventilation of the first circuit and a simplified manner of changing pressures, as will be shown below.

When the source of pressure is intact and the first brake circuit is also intact, the auxiliary piston is exposed to the primary pressure of the pressure source and not, as in the known state-of-the-art, to the controlled pressure. Thus the requirement described in the state-of-the-art for making the friction of the auxiliary piston larger than the friction of the control piston so as to prevent the displacement of the former during normal operation, is not present here. Furthermore, the invention provides an extension of the auxiliary piston which mechanically displaces the operating piston of the second main brake cylinder when the source of pressure fails or the first circuit becomes inoperative. This arrangement is a substantial simplification.

In the master brake cylinder according to the invention, just as in the cited Offenlegungsschrift, the control piston is preferably made in two parts and a coupler is interposed between the two members for the purpose of simulating piston travel and this coupler may preferably be a spring.

The control piston and the parts cooperating therewith are so embodied that, in the initial position, there is a fluid communication between the storage container and the first brake circuit which permits the decay of pressure at the end of the braking cycle. When the brake is actuated, this communication is interrupted immediately. This interruption may take place by the control piston closing a relief aperture after a very small motion, but preferably there is also provided a seat valve, the movable part of which travels with the control piston and closes the valve for interruption of the above-mentioned communication. With appropriate dimensions of the end faces of the portions of the valve located on the control piston, the valve may be so embodied that it closes for a given actuating force and reopens at a smaller actuating force. In order to shorten the overall length of the apparatus, the path simulator between the two control piston parts at least partially surrounds the control piston.

The extension of the auxiliary piston or the piston itself may be provided with a valve which is located in the supply line of pressure from the first brake circuit to the control chamber of the second circuit and which is held open by a rod attached to the piston of the second brake cylinder when the second brake cylinder is intact. As a result, this valve closes when the second brake circuit is defective and the second piston is displaced more than a permissible amount with respect to the auxiliary piston.

In order to monitor the condition of the second piston, for example to sense inadequate ventilation, a further embodiment of the invention provides a pin extending radially into the brake cylinder of the second circuit. The degree of penetration of this pin into the cylinder is changed by a secondary piston which is actuated by the control pressure in the second circuit. The pin may also be displaced relative to this secondary piston in the sense of reducing its extension into the main cylinder and during such relative motion, an electric switch is actuated. The piston of the second brake circuit is provided with a taper which displaces the pin relative to the secondary piston when the main piston displacement is too large for the control pressure. The warning signal then produced by the closed electric switch indicates that this second circuit is faulty, for example due to inadequate ventilation.

Inasmuch as it may be required by law that an auxiliary piston must move even during normal operation, the side of the auxiliary piston opposite that affected by brake source pressure is coupled by a spring, especially a pan-shaped spring, to the fixed member of the cylinder so that, when the pressure on the auxiliary piston changes, it undergoes small displacements.

The source of pressure, which includes a pump and a hydraulic storage container, is preferably connected with a chamber ahead of the auxiliary piston by a check valve which opens in the direction of this chamber and thus prevents a pressure increase but not a pressure decrease. This insures that, if the source of pressure should fail, the pressure medium in the chamber ahead of the auxiliary piston may not escape into the hydraulic storage.

The invention will be better understood as well as further objects thereof become more apparent from the ensuing detailed description of exemplary embodiments taken in conjunction with the drawing.

DESCRIPTION OF THE PREFERRED EMBODIMENTS

Figure 1:
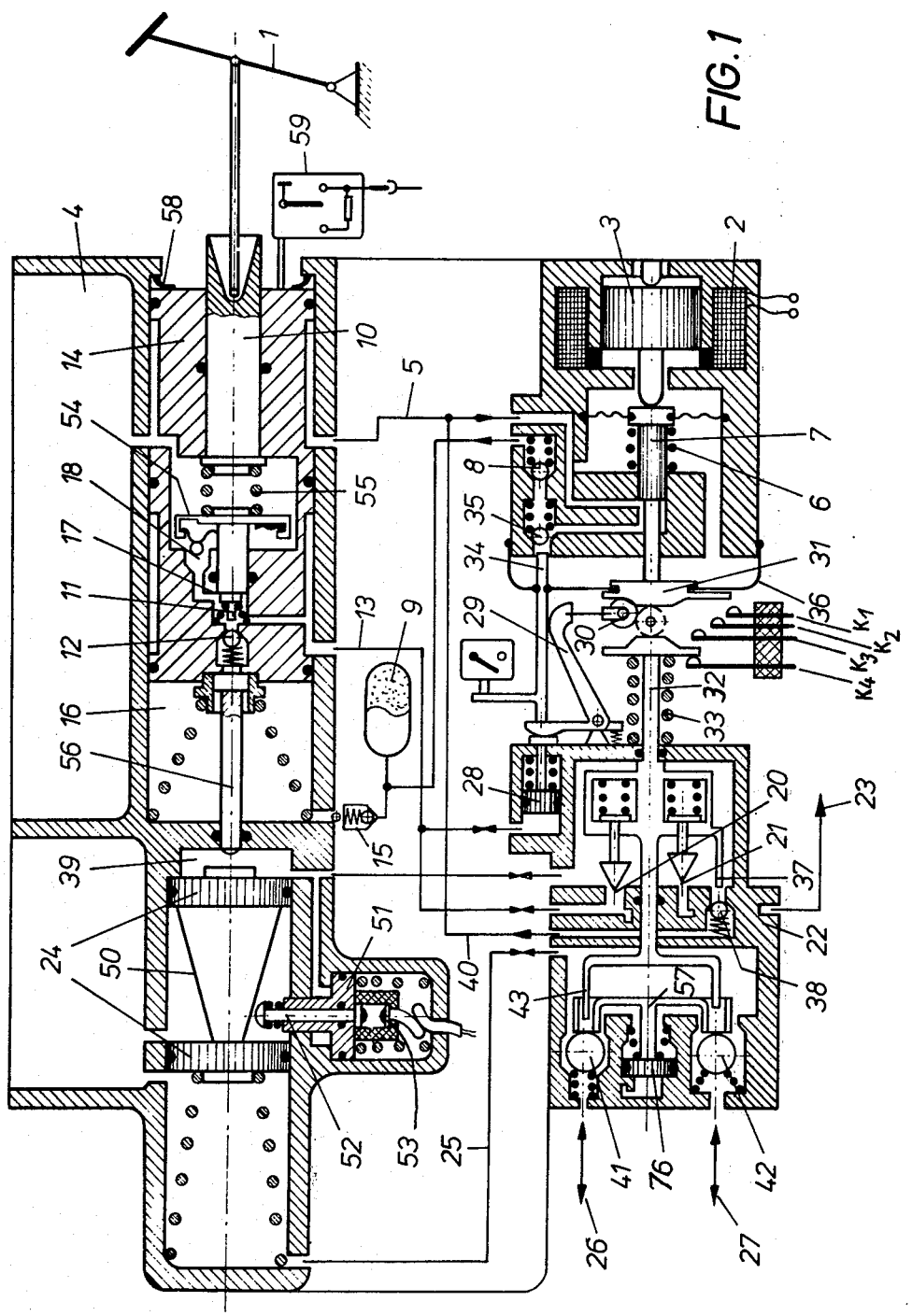
FIG. 1 is a sectional drawing through a master cylinder according to the invention.

Turning now to FIG. 1, there is illustrated the first embodiment of the invention showing an electromagnetic pump drive including a coil 2, an armature 3 and a spring 6. In one position of a piston 7, brake fluid flows from a reservoir 4 through a conduit 5 to the pump cylinder and is delivered by the driven pump piston 7 through a check valve 8 to an elastic storage container 9. The pump and the storage container represent the source of brake fluid pressure which is connected through a check valve 15 with a pressure chamber 16. The control piston 10 consists of two parts coupled together by means of a coupler 55 and the control piston 10 is actuated by a brake pedal 1 via suitable linkage. The motion of the control piston 10 in turn displaces a pin 11 which pushes open the brake valve 12. Thus, pressure is admitted to the line 13. The same pressure acts backward onto the brake pedal via the piston 10 so that the operator receives information as to the magnitude of the applied pressure. An auxiliary piston 14 is provided as an emergency piston. In the illustrated initial position of the control piston, the line 13, and hence the first brake circuit, is connected to the reservoir 4. This connection is closed, however, by pedal actuation, firstly by the passage of a relief valve 17 and, supplementarily, by a seat valve 18. The pressure admitted to the line 13 acts, firstly, through the open valve 20 and the valve 21 of the five position valve 22, on the rear axle brake circuit which would be connected at the location 23 and it also acts, through the open valve 20, on the piston 24. The displacement of this piston causes the pressure in the second brake circuit (line 25) to be built up. In order to control the second brake circuit, the piston 24 has an inclined surface 50, and a sensor pin 52 extends radially into a cylinder chamber. This pin is sliding within a piston 51; the relative position of the sensor pin 52 and the piston 51 may be altered against the force of the spring. When the pin 52 is displaced with respect to the piston 51, it actuates a contact 53 in a warning circuit. The piston is exposed to the pressure within the control chamber 39.

When the pedal 1 is actuated, the communication 13 to the fluid storage container is interrupted by the relief valve 17 and seal valve 18 and the valve 12 is opened so that the pressure in the first brake circuit 23 increases directly, and is also admitted via control chamber 39 through the piston 24 to the second brake circuit. If the source of pressure becomes inoperative and the valve 12 is opened, because there is no pressure in chamber 16 — the piston 14 is displaced to the left by means of piston 10, spring 55 and the stop 54; hereby a part of the fluid in chamber 16 is displaced into the brake circuit 23 and into chamber 39 so that a normal two-circuit brake system becomes operative. As is usually the case with brake force amplifiers, the characteristic curve of braking pressure as a function of pedal travel has a knee, as does the curve of pedal force versus pedal travel. This means that, at the end of the domain of power amplification, the path of the pedal may be increased only with very high pedal forces while the brake pressure increases accordingly. Due to the presence of the path simulator 55 and because of the control pressure reacting onto the pedal 1, the operator receives at all times sensations of customary brake actuation. If, in the embodiment of FIG. 1, the first brake circuit is defective, for example leaks, the auxiliary piston 14 is displaced also but the displaced fluid does not cause any braking action in one of the circuits. However, the pin 56 moves the piston 24, i.e., braking occurs in the second circuit.

If, on the other hand, it is the second brake circuit which leaks, the contact 53 senses that condition. Normally, the piston 51 is so influenced by the control pressure that it displaces the pin 52 and so varies its extension that the ramp 50 causes no relative displacement of the pin 52 and the piston 51. On the other hand, when the second brake circuit 25 is leaking, the pressure admitted in the chamber 39 results in a more than proportional displacement of the piston 24 but not of piston 51 and the contact 53 thus is closed, causing a warning to be exhibited to the operator. This warning may also be used to actuate a shut-off valve which closes off the outlet of the main brake cylinder to the line 25 or else closes off the inlet to the control chamber 39 (not shown). In FIG. 1, a similar effect in case of a leaking is achieved in that the pressure ahead of the valve 20 and effective at the left of piston 76 displaces this piston 76 against the smaller counterpressure on the right (because of the leaking). The closure elements 41 and 42 are no longer lifted from their seats by the lifter 57 Serial No. 703,799 and therefore obturate their respective conduits. This displacement of the lifter 57 also takes place when wheel-lock prevention and consequent brake pressure control becomes operative and thus the brake pressure on the left of piston 76 is higher than on its right. During normal braking the closure elements 41 and 42 are lifted by lifter 57.

The warning switch 53 also indicates a condition of a poorly ventilated (bled) circuit 2.

The leaf spring 58 is so dimensioned that during small variations of pressure control, associated minor movements of the auxiliary piston take place.

A switch 59 is provided which indicates in one of its two positions whether the auxiliary piston 14 is in its initial position or whether it has been displaced due to a failure of pump power.

The second brake circuit is divided in the five-stage valve 22 into two separate partial circuits 26 and 27 which include valves for separate pressure decay and which lead to the two front wheels.

This five-stage valve 22 is moved into definite positions by means of the elements 2, 3 and 7. In unbraked operation, the armature 3 is peridically moved to the left by means of current pulses in the winding 2 and returned by the spring 6. The armature 3 also moves pump-piston 7 to the left whereby pressure fluid is pumped via valve 8 to the pressure reservoir 9. If in case of braking the control pressure is produced in line 13, this control pressure also determines the position of the piston 28 which, after the pressure reaches a predetermined but low value, so far displaces the lever 29 that a coupler, embodied here by way of example as a roller 30, is placed between a part 31 moved by the elements 2, 3 and 6 and a movable valve member 32. The distance between the movable part 32 of five-position valve 22, forced to the right in the figure by the spring 33, and the element 31 is chosen so that, during normal pump operation, the members 31 and 32 are not in engagement and that their coupling is insured only after the roller 30 has pivoted into the intervening position shown in dotted lines. Further connected to the lever 29 is a rod 34 which opens the valve 35 after the piston 28 has been displaced to the right and thus renders the pump ineffective due to the elastic property of the wall 36. Thus in case of braking, the elements 2, 3 and 6 only are used to move member 32 in definite positions and hereby to close and open valves in the five-position valve 22 while the pump in this case is made ineffective. The displacement of the armature 3 is sensed during that movement into definite positions by contacts $K_1$ to $K_4$. In the illustrated initial position of the drive, the contact $K_4$ makes contact with member 32; in this position of member 32 the pressure may increase at all brakes (connected to 23, 26 and 27). If member 32 must be moved into the second position (according to lock in a tendancy in which the valve 20 will be closed, the armature 3 is moved until contact $K_1$ makes contact with member 31 and thus signals the arrival in that position in which any further build-up of brake pressure is terminated at all wheels. In the third position of the valve, brought about by the additional making contact of contact $K_2$ to member 31, a pin 37 lifts a closure body 38 from its seat so that, subsequently, a control chamber 39 and the rear axle brake circuit connected at the location 23 are connected to a return line 40 and a reduction of pressure results. Due to the presence of check valves 41 and 42, which are not lifted by lifter 57 during pressure control, however, there is no decrease of the brake pressure at the front wheels of the vehicle. The fourth position of the apparatus is reached, when the contact $K_3$ also contacts member 31; in this position valve 21 is closed and a pin 43 lifts closure body of the valve 41, resulting in a pressure decrease in the partial circuit 26 and nowhere else. The decrease is possible because control member 39 is still connected to return line 40 and thus piston 24 can move to the right.

In the last position of the armature (not equipped with a special contact) and member 32, the closure member of valve 41 is pressed onto a second valve seat (at the left) while the closure member of valve 42 is lifted from its valve seat so that now the pressure decay takes place only in the circuit 27.

As will be seen from the figure, the valves contained within the five-position valve 22 are seat valves in which the closure members move against spring pressure relative to the independently movable valve member of the five position valve. The forces of the springs, together with that of the spring 33, constitute the total spring force which acts on the armature in stepwise manner.

The closure of the individual contacts $K_1$ to $K_4$ indicates to the control circuit for the coil 2 whether the armature has reached its intended position. In that case, the power is reduced. For example, if the five-position valve is to be brought into the position which would reduce the pressure in the partial circuit 26, the control circuit supplies the full control power to the coil 2 until such time as the contact $K_3$ indicates that the intended position has been reached and a power reduction is initiated.

Figure 2:
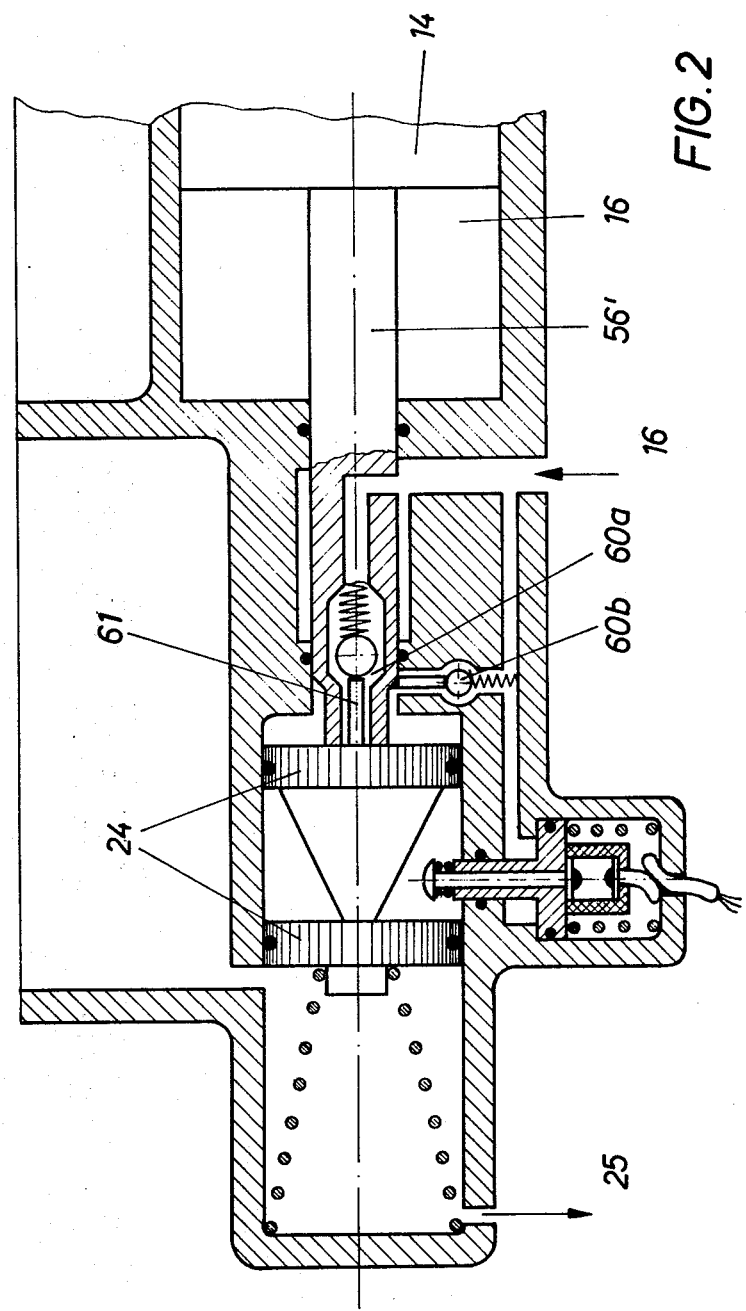
FIG. 2 is a detail of FIG. 1 in a second embodiment of the invention.

FIG. 2 illustrates in greater detail the left portion of the main brake cylinder in FIG. 1 and just indicates the leftmost portion of the auxiliary piston 14 in addition to the piston 24 of the second circuit and the extension 56' of the auxiliary piston 14. This extension includes a valve 60a and there is provided a further valve 60b. During normal braking, the piston 24 is displaced to the left and the valve 60a is closed, while valve 60b remains open. If, however, the pressure in the cylinder 16 decreases, the extension 56' travels to the left and closes off the valve 60b. If the circuit 25 is also leaking, the excursion of the piston then also closes the valve 60a.

Figure 3:
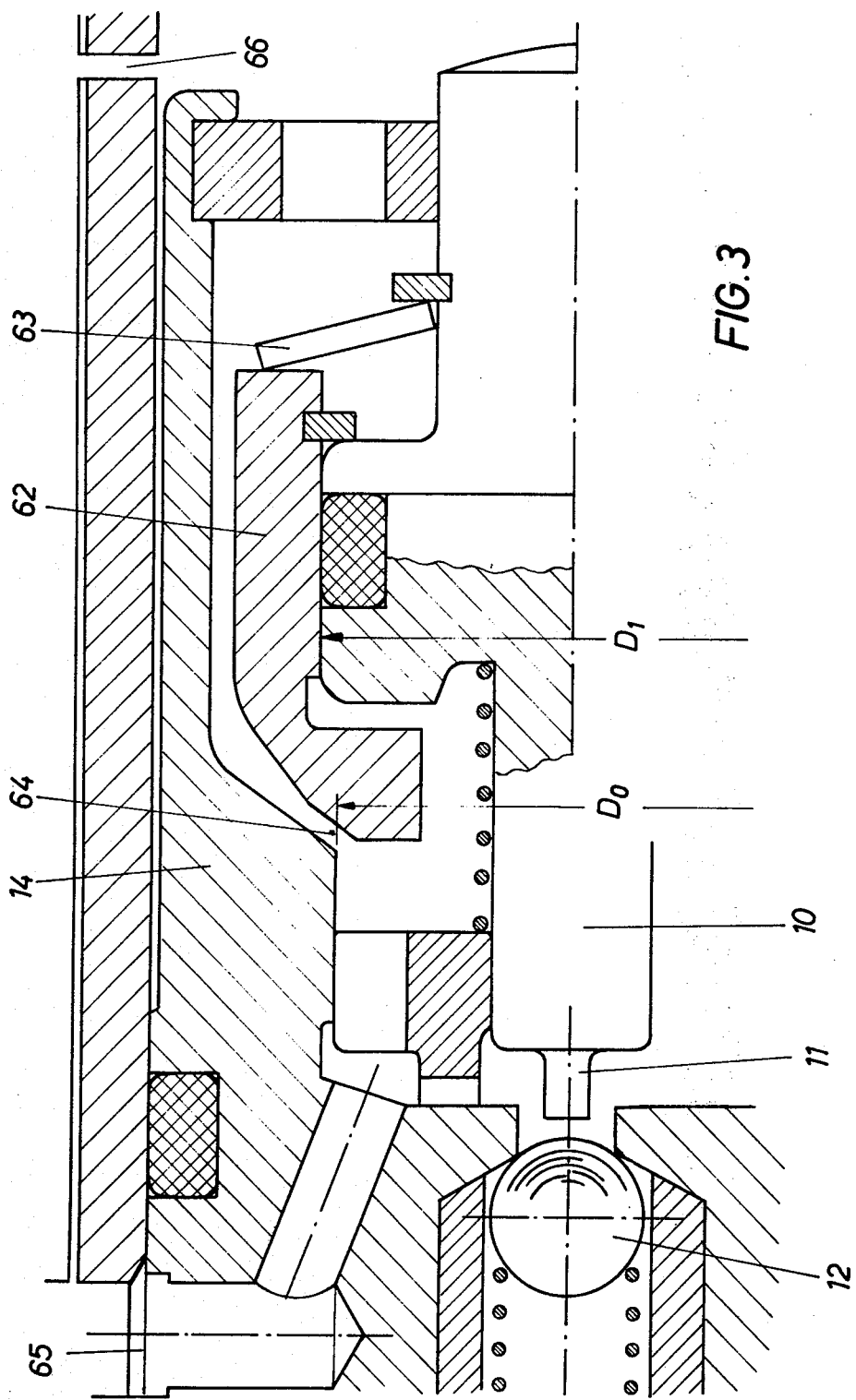
FIG. 3 is a partial illustration of the auxiliary piston of FIG. 1.

FIG. 3 shows a portion of the auxiliary piston 14, the control piston 10, the valve 12 and the pin 11, which opens the valve 12, in greater detail. This figure illustrates a possibility of embodiment of the seat valve 18 in FIG. 1. The control piston 10 includes a member 62 which can be displaced against the force of the leaf spring 63. If the control piston is moved to the left, adjacent surfaces come into contact at the location 64 just prior to the opening of valve 12, thus closing the connection between the valve 18, connected at the location 65 and the opening 66, which leads to the reservoir 4. By suitable dimensions of those surfaces of the part 62 which are exposed to the control pressure after the closure, one may obtain a hysteresis effect in this valve. This will be the case if the diameter $D_0$ of the attachment ring at the location 64 is smaller than the diameter $D_1$ since a differential pressure force will then act on the piston 10 toward the right, as seen in the figure. If the two diameters $D_0$ and $D_1$ were identical, the differential force would be zero.

Figure 4:
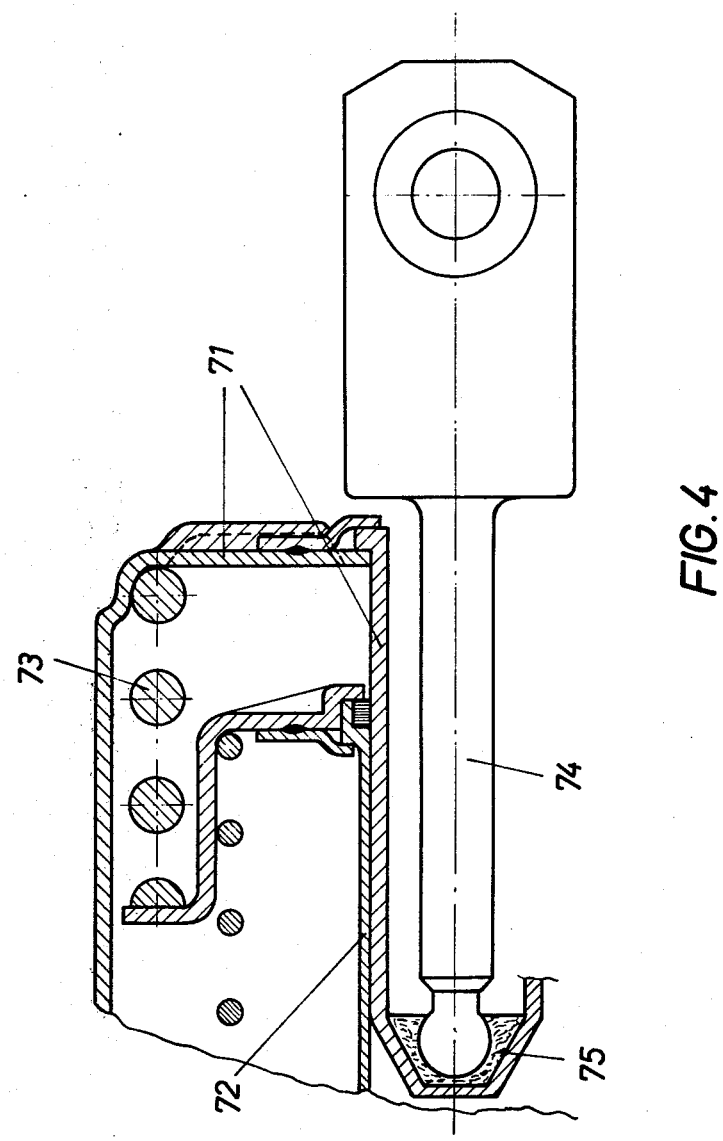
FIG. 4 shows the control piston in a further embodiment of the invention.

FIG. 4 illustrates the control piston including two parts 71 and 72 between which is located a spring 73 acting as a path simulator. Embedded in an elastic portion 75 of the first part 71 is an actuating rod 74 which is limitedly pivotable and which is connected to the brake pedal. When the brake pedal is actuated, the part 71 is displaced within the part 72 and displaces part 72 via the spring 73, thereby opening the valve 12. The embodiment illustrated in FIG. 4 substantially reduces the length of the required construction.

The foregoing represents preferred embodiments of the invention, it being understood that numerous other variants and embodiments are possible within the spirit and scope of the invention, the latter being defined by the appended claims.

What is claimed is:

1. In a master brake cylinder for a first and second brake circuit forming a two circuit braking system including a housing; a brake fluid reservoir; a brake fluid pressure source; an auxiliary piston having a pedal-actuated side and which together with the housing defines a first main cylinder; a control piston sliding within the auxiliary piston; a brake control valve means; and a second main cylinder and piston for the second brake circuit having a control chamber, the brake control valve means including a portion being actuated by the control piston for establishing fluid communication between the brake fluid pressure source and the first brake circuit and the control chamber of the second main cylinder, the portion of said brake control valve means being exposed to the pressure in the first brake circuit and the control piston having means for engaging and carrying along the auxiliary piston after a predetermined amount of axial travel, the improvement comprising, auxiliary piston extension means for actuating said piston in said second main cylinder when said auxiliary piston and said control piston approach within a predetermined distance of said second main cylinder piston, wherein said auxiliary piston is exposed on the side remote from said pedal-actuated side to the pressure of the brake fluid pressure source, and wherein said portion of said brake control valve means is disposed within said auxiliary piston, secondary piston means and pin means sliding therein, said secondary piston means being exposed to the pressure in said second main cylinder and varying the extension of said pin means into said second main cylinder by sliding displacement with respect to said secondary piston means and further including electric switch means actuated by the relative approach of said pin means and said secondary piston means and wherein said piston in said second main cylinder has a tapered wall capable of displacing said pin means relative to said secondary piston means, thereby actuating said switch means when insufficient pressure exists in said second main cylinder for causing said secondary piston means and said pin means to move away from said tapered surface.

* * * * *